US009898849B2

(12) United States Patent
Du et al.

(10) Patent No.: US 9,898,849 B2
(45) Date of Patent: Feb. 20, 2018

(54) FACIAL EXPRESSION BASED AVATAR RENDERING IN VIDEO ANIMATION AND METHOD

(71) Applicant: Intel Corporation, Santa Clara, CA (US)

(72) Inventors: Yangzhou Du, Beijing (CN); Wenlong Li, Beijing (CN); Qiang Li, Beijing (CN); Xiaofeng Tong, Beijing (CN); Tae-Hoon Kim, Seoul (KR); Minje Park, Seongnam (KR)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 14/775,324

(22) PCT Filed: Nov. 5, 2014

(86) PCT No.: PCT/CN2014/090327
§ 371 (c)(1),
(2) Date: Sep. 11, 2015

(87) PCT Pub. No.: WO2016/070354
PCT Pub. Date: May 12, 2016

(65) Prior Publication Data
US 2016/0300379 A1    Oct. 13, 2016

(51) Int. Cl.
*G06T 13/40* (2011.01)
*G10L 25/48* (2013.01)
(Continued)

(52) U.S. Cl.
CPC .......... *G06T 13/40* (2013.01); *G06F 17/2785* (2013.01); *G06K 9/00248* (2013.01);
(Continued)

(58) Field of Classification Search
CPC .. G06K 9/00; G06K 9/00248; G06K 9/00281; G06K 9/00308; G06T 13/205; G06T 13/40; G10L 25/48; G06F 17/2785
See application file for complete search history.

(56) References Cited

U.S. PATENT DOCUMENTS 6,661,418 B1 * 12/2003 McMillan ............. G06T 13/205
                                                         345/473
6,919,892 B1 *  7/2005 Cheiky ................... G06T 13/40
                                                         345/473

(Continued)

FOREIGN PATENT DOCUMENTS

CN       1460232 A     12/2003
CN     102934144 A      2/2013

(Continued)

OTHER PUBLICATIONS

Jie Ding et al., Classification of Tongue Images Based on Doublet SVM, 2016 International Symposium on System and Software Reliability.*

(Continued)

*Primary Examiner* — Sean Conner
*Assistant Examiner* — Pinalben Patel
(74) *Attorney, Agent, or Firm* — Schwabe, Williamson & Wyatt, P.C.

(57) ABSTRACT

Apparatuses, methods and storage medium associated with creating an avatar video are disclosed herein. In embodiments, the apparatus may one or more facial expression engines, an animation-rendering engine, and a video generator. The one or more facial expression engines may be configured to receive video, voice and/or text inputs, and, in response, generate a plurality of animation messages having facial expression parameters that depict facial expressions for a plurality of avatars based at least in part on the video, voice and/or text inputs received. The animation-rendering (Continued)

engine may be configured to receive the one or more animation messages, and drive a plurality of avatar models, to animate and render the plurality of avatars with the facial expression depicted. The video generator may be configured to capture the animation and rendering of the plurality of avatars, to generate a video. Other embodiments may be described and/or claimed.

25 Claims, 7 Drawing Sheets

(51) Int. Cl.
*G06F 17/27* (2006.01)
*G06K 9/00* (2006.01)
*G06T 13/20* (2011.01)

(52) U.S. Cl.
CPC ..... *G06K 9/00281* (2013.01); *G06K 9/00308* (2013.01); *G06T 13/205* (2013.01); *G10L 25/48* (2013.01)

(56) References Cited

U.S. PATENT DOCUMENTS

| | | |
|---|---|---|
| 8,010,474 B1 | 8/2011 | Bill |
| 8,542,879 B1* | 9/2013 | Nechyba ............ G06K 9/00228 382/103 |
| 2002/0194006 A1* | 12/2002 | Challapali ............... G06T 13/40 704/276 |
| 2003/0117485 A1* | 6/2003 | Mochizuki ............. G06T 13/40 348/14.01 |
| 2005/0057570 A1* | 3/2005 | Cosatto ................... G06T 13/40 345/473 |
| 2010/0026831 A1* | 2/2010 | Ciuc .................. G06K 9/00221 348/222.1 |
| 2011/0096149 A1* | 4/2011 | Au ..................... G06K 9/00771 348/47 |
| 2011/0304629 A1* | 12/2011 | Winchester ............. G06T 13/40 345/473 |
| 2012/0026174 A1* | 2/2012 | McKeon ............... G06T 13/205 345/473 |
| 2013/0015946 A1* | 1/2013 | Lau .......................... G07C 9/00 340/5.2 |
| 2013/0235045 A1* | 9/2013 | Corazza .................. G06T 13/40 345/473 |
| 2014/0143682 A1* | 5/2014 | Druck .................. G06Q 10/107 715/752 |
| 2015/0035825 A1* | 2/2015 | Zhou ...................... G06T 13/40 345/419 |
| 2016/0163084 A1* | 6/2016 | Corazza .................. G06T 13/40 345/419 |

FOREIGN PATENT DOCUMENTS

| | | |
|---|---|---|
| CN | 103093490 A | 5/2013 |
| CN | 103473801 A | 12/2013 |

OTHER PUBLICATIONS

International Search Report and Written Opinion dated Aug. 10, 2015 for International Application No. PCT/CN2014/090327, 11 pages.

* cited by examiner

Non-transitory computer-readable storage medium
702

Programming Instructions 704
configured to cause a device, in response to execution of the programming instructions, to practice (aspects of) embodiments of the processes of Figures 1-5.

Figure 7

FACIAL EXPRESSION BASED AVATAR RENDERING IN VIDEO ANIMATION AND METHOD

CROSS REFERENCE TO RELATED APPLICATIONS

The present application is a national phase entry under 35 U.S.C. § 371 of International Application No. PCT/CN2014/090327, filed Nov. 5, 2014, entitled "AVATAR VIDEO APPARATUS AND METHOD ", which designated, among the various States, the United States of America. The Specification of the PCT/CN2014/090327 Application is hereby incorporated by reference.

TECHNICAL FIELD

The present disclosure relates to the field of data processing. More particularly, the present disclosure relates to the creation of avatar video, including tongue-out detection.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Micro-movies and cartoon videos made by amateurs have become increasingly popular, in particular, in social networks. An example is the 'Annoying Orange' American comedy series shared on YouTube®, where an anthropomorphic orange annoys other fruits, vegetables, and various other objects, and make jokes. Each of these videos usually consists of simple characters, but tells an interesting story. While these video typically do not require large budgets or major studio backings to produce them, it is still nonetheless not easy for an amateur to create it via today's graphics editing software and/or movie composition suites. Often, a small studio, with experienced artists having some years of accumulated art skills in, e.g., human action capturing and retargeting, character animation and rendering, is still required.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 7 illustrates a storage medium having instructions for practicing methods described with references to FIGS. 1-5, according to disclosed embodiments.

DETAILED DESCRIPTION

Figure 1:
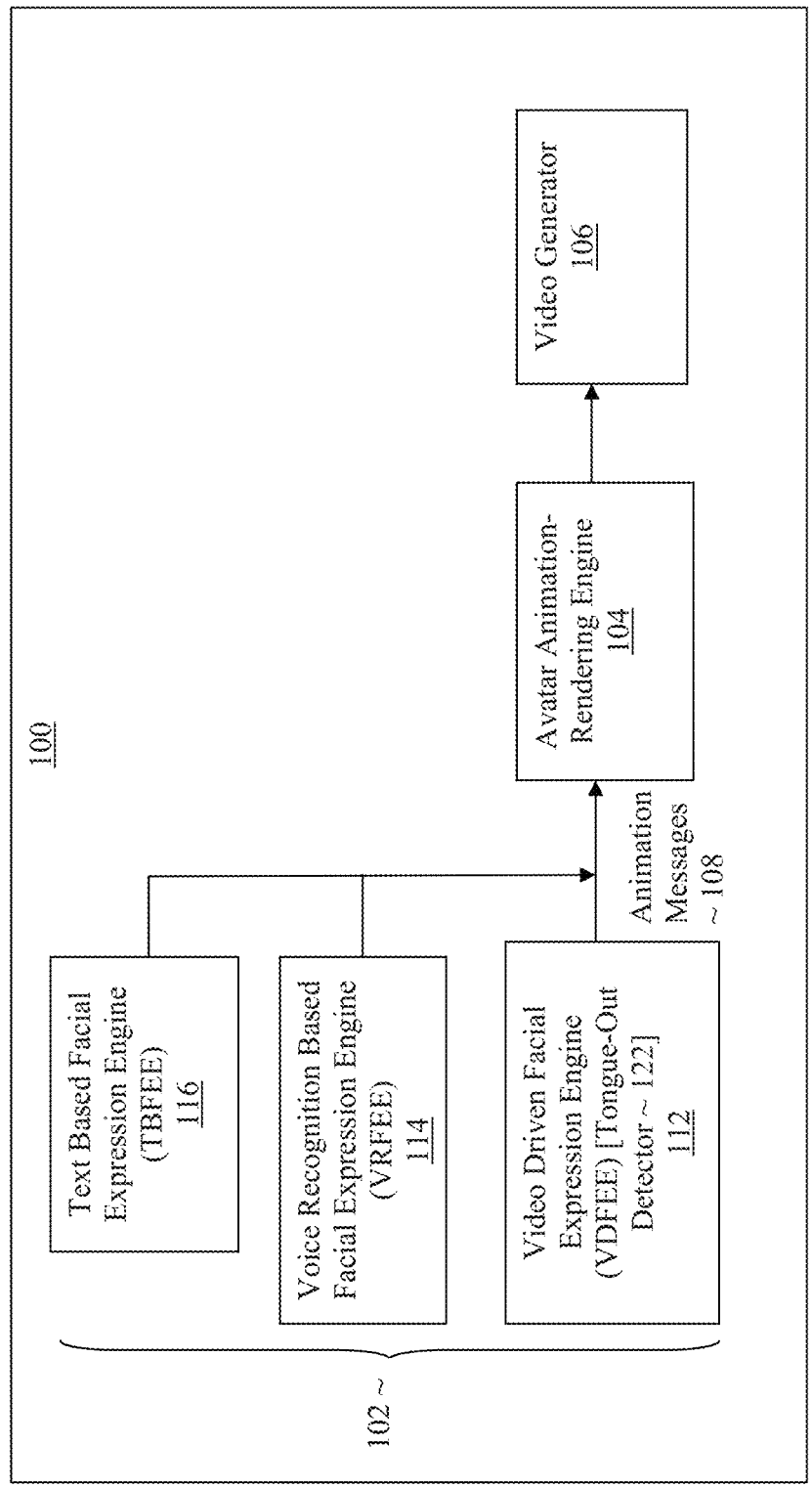
FIG. 1 illustrates a block diagram of an avatar video generation system, according to the disclosed embodiments.

Apparatuses, methods and storage medium associated with creating an avatar video are disclosed herein. In embodiments, the apparatus may one or more facial expression engines, an animation-rendering engine, and a video generator coupled with each other. The one or more facial expression engines may be configured to receive video, voice and/or text inputs, and, in response, generate a plurality of animation messages having facial expression parameters that depict facial expressions for a plurality of avatars based at least in part on the video, voice and/or text inputs received. The animation-rendering engine may be coupled with the one or more facial expression engines, and configured to receive the one or more animation messages, and drive a plurality of avatar models, to animate and render the plurality of avatars with the facial expressions depicted. The video generator may be coupled with the animation-rendering engine, and configured to capture the animation and rendering of the plurality of avatars, to generate a video.

In embodiments, a video driven facial expression engine may include a tongue-out detector. The tongue-out detector may include a mouth region detector, a mouth region extractor, and a tongue classifier, coupled with each other. The mouth region detector may be configured to identify locations of a plurality of facial landmarks associated with identifying a mouth in the image frame. The mouth region extractor may be coupled with the mouth region detector, and configured to extract a mouth region from the image frame, based at least in part on the locations of the plurality of facial landmarks identified. The tongue classifier may be coupled with the mouth region extractor to analyze a plurality of sub-windows within the mouth region extracted to detect for tongue-out. In embodiments, the tongue-out detector may further include a temporal filter coupled with the tongue classifier and configured to receive a plurality of results of the tongue classifier for a plurality of image frames, and output a notification of tongue-out detection on successive receipt of a plurality of results from the tongue classifier indicating tongue-out detection for a plurality of successive image frames.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an avatar video generation system, according to the disclosed embodiments, is shown. As illustrated, avatar video generation system 100 may include one or more facial expression engines 102, avatar animation-rendering engine 104, and video generator 106, coupled with each other as shown. As described earlier, and in more detail below, the one or more facial expression engines 102 may be configured to receive video, voice and/or text inputs, and, in response, generate a plurality of animation messages 108 having facial expression parameters that depict facial expressions for a plurality of avatars based at least in part on the video, voice and/or text inputs received. The facial expressions may include, but are not limited to, eye and/or mouth movements, head poses, such as, head rotation, movement, and/or coming closer or farther from the camera, and so forth. Animation-rendering engine 104 may be coupled with the one or more facial expression engines 102, and configured to receive the one or more animation messages 108, and drive a plurality of avatars model, to animate and render the plurality of avatars with the facial expressions depicted. Video generator 106 may be coupled with animation-rendering engine 104, and configured to capture the animation and rendering of the plurality of avatars, to generate a video.

In embodiments, facial expression engines 102 may include video driven facial expression engine (VDFEE) 112, video recognition facial expression engine (VRFEE) 114, and text based facial expression engine (TBFEE) 116, coupled in parallel with avatar animation-rendering engine 104.

VDFEE 112 may be configured to receive video inputs having a plurality of image frames (e.g., from an image source, such as a camera (not shown)), and analyze the image frames for facial movements, such as, but not limited to eye and/or mouth movements, head poses, and so forth. Head poses may include head rotation, movement, and/or coming closer or farther from the camera. Additionally, VDFEE 112 may be configured to generate a number of animation messages 108 having facial expression parameters that depict facial expressions for a plurality of avatars. The generation of the animation messages 108 may be performed, based at least in part on results of the analysis of the image frames. For example, VDFEE 112 may be configured to analyze the image frames for landmarks of a face or head poses, and generate at least a subset of the plurality of animation messages 108 having facial expression parameters that depict facial expressions for the plurality of avatars. The facial expressions may include eye and mouth movements or head poses of the avatars, based at least in part on landmarks of a face or head poses of the image frames. In embodiments, VDFEE 112 may be configured with (or provided access to) data with respect to blend shapes (and optionally, corresponding weights) to be applied to a neutral version of an avatar to morph the avatar to have the various facial expressions. Accordingly, VDFEE 112 may generate animation messages 108 with identification of blend shapes (and optionally, corresponding weights) to be applied to the neutral version of an avatar to morph the avatar to have particular facial expressions.

Any number of known techniques may be employed to identify a face in each of a number of image frames, and track the face over the number of image frames to detect facial movements/expressions and/or head poses. In embodiments, VDFEE 112 may employ a facial mesh tracker to identify and track a face, and to detect the facial expressions. The facial mesh tracker may, e.g., be the facial mesh tracker disclosed in PCT Application PCT/CN2014/073695, entitled FACIAL EXPRESSION AND/OR INTERACTION DRIVEN AVATAR APPARATUS AND METHOD, filed on Mar. 19, 2014.

In embodiments, the mouth movements may include the avatars sticking their tongues out. Any number of known techniques may be employed to detect a tongue-out condition. However, in embodiments, the face mesh tracker may include a tongue-out detector 122 of the present disclosure to more efficiently detect the tongue-out condition, to be described more fully below.

VRFEE 114 may be configured to receive audio inputs, analyze the audio inputs, and generate a number of the plurality of animation messages 108 having facial expression parameters that depict facial expressions for the plurality of avatars. The generation of animation messages 108 may be performed, based at least in part on results of the analysis of the audio inputs. For example, VRFEE 114 may be configured to analyze the audio inputs for at least volume or syllable, and generate the plurality of animation messages 108 having facial expression parameters that depict facial expressions for the plurality of avatars. The facial expressions may include mouth movements of the plurality of avatars, and the mouth movements may be selected, based at least in part on volume or syllable of the audio inputs. In embodiments, VRFEE 114 may be configured with (or provided access to) data with respect to correspondence of volume and/or syllables to facial expressions. Further, similar to VDFEE 112, VRFEE 114 may be configured with (or provided access to) data with respect to blend shapes (and optionally, corresponding weights) to be applied to a neutral version of an avatar to morph the avatar to have various facial expressions. Accordingly, VRFEE 114 may generate animation messages 108 with identification of blend shapes (and optionally, corresponding weights) to be applied to a neutral version of an avatar to morph the avatar to have particular facial expressions.

TBFEE 116 may be configured to receive text inputs, analyze the text inputs, and generate a number of the plurality of animation messages 108 having facial expression parameters depicting facial expressions for the plurality of avatars. The generation of the animation messages 108 may be performed, based at least in part on results of the analysis of the text inputs. For example, TBFEE 116 may be configured to analyze the text inputs for semantics, and generate at least a subset of the plurality of animation messages having facial expression parameters that depict facial expressions for the plurality of avatars. The facial expression may be include mouth movements of the plurality of avatars, and the mouth movements may be selected, based at least in part on semantics of the text inputs. In embodiments, TBFEE 116 may be configured with (or provided access to) data with respect to correspondence of variance semantics to facial expressions. Further, similar to VDFEE 112 and VRFEE 114, TBFEE 116 may be configured with (or provided access to) data with respect to blend shapes (and optionally, corresponding weights) to be applied to a neutral version of an avatar to morph the avatar to have various facial expressions. Accordingly, TBFEE 116 may generate animation messages 108 with identification of blend shapes (and optionally, corresponding weights) to be applied to a neutral version of an avatar to morph the avatar to have particular facial expressions.

Continue to refer to FIG. 1, avatar animation-rendering engine 104 may be configured to receive animation messages 108, and drive one or more avatar models, in accordance with animation messages 108, to animate and render the avatars, replicating facial expressions and/or head movements depicted. In embodiments, avatar animation-rendering engine 104 may be configured with a number of avatar models to animate a number of avatars. Avatar animation-rendering engine 104 may also be configured with an interface for a user to select avatars to correspond to various characters of a story. Further, as alluded to earlier, avatar animation-rendering engine 104 may animate a facial expression, through blending of a plurality of pre-defined shapes, making avatar video generation system 100 suitable to be hosted by a wide range of mobile computing devices. In embodiments, a model with neutral expression and some typical expressions, such as mouth open, mouth smile, brow-up, and brow-down, blink, etc., may be first pre-constructed, prior to facial tracking and animation. The blend shapes may be decided or selected for various facial expression engines 102 capabilities and target mobile device system requirements. During operation, facial expression engines 102 may output the blend shape weights (e.g., as part of animation messages 108) for avatar animation-rendering engine 104.

Upon receiving the blend shape weights ($\alpha_i$) for the various blend shapes, avatar animation-rendering engine 104 may generate the expressed facial results with the formula:

$$B^* = B_o + \sum_i \alpha_i \cdot \Delta B_i$$

where B* is the target expressed facial,
$B_o$ is the base model with neutral expression, and
$\Delta B_i$ is $i^{th}$ blend shape that stores the vertex position offset based on base model for specific expression.

Compared with other facial animation techniques, such as motion transferring and mesh deformation, using blend shape for facial animation may have several advantages: 1) Expressions customization: expressions may be customized according to the concept and characteristics of the avatar, when the avatar models are created. The avatar models may be made more funny and attractive to users. 2) Low computation cost: the computation may be configured to be proportional to the model size, and made more suitable for parallel processing. 3) Good scalability: addition of more expressions into the framework may be made easier.

Still referring to FIG. 1, video generator 106 may be configured to capture a plurality of image frames of the animation and rendering of the plurality of avatars, and generate a video based at least in part on the image frames of the animation and rendering captured. In embodiments, video generator 106 may capture an array of avatars animated by avatar animation-rendering engine 104. In other embodiments, video generator 106 may be coupled with multiple avatar animation-rendering engines 104. For these embodiments, a video scene may contain multiple avatars animated by the multiple animation-rendering engines 104 simultaneously.

Each of facial expression engines 102, avatar animation-rendering engine 104, and/or video generator 106 may be implemented in hardware, software or combination thereof. For example, each of facial expression engines 102, avatar animation-rendering engine 104, and/or video generator 106 may be implemented with Application Specific Integrated Circuits (ASIC), programmable circuits programmed with the implementation logic, software implemented in assembler languages or high level languages compilable into machine instructions supported by underlying general purpose and/or graphics processors.

Figure 2:
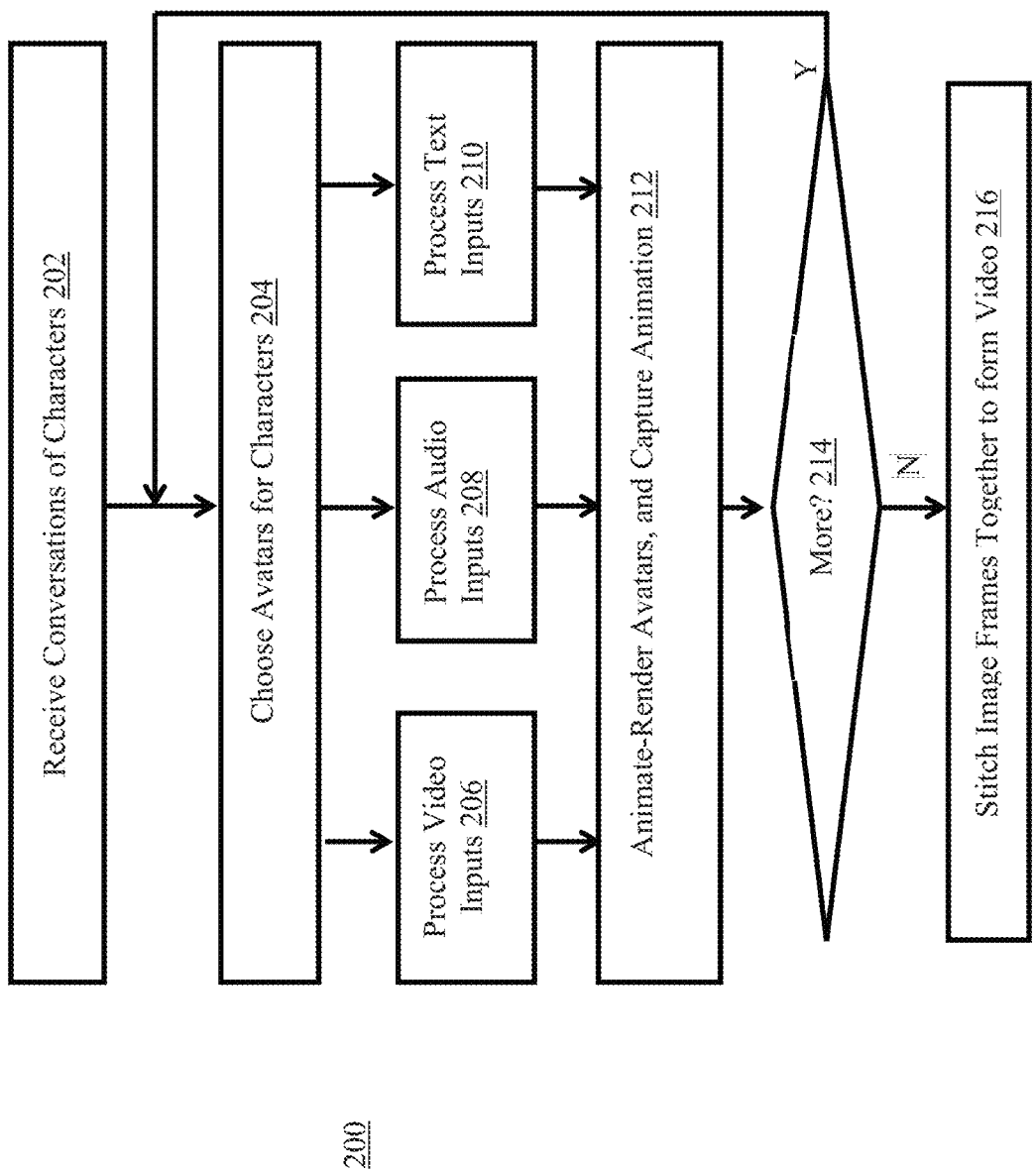
FIG. 2 illustrate a process for generating an avatar video, according to the disclosed embodiments.

Referring now to FIG. 2, wherein a process for generating an avatar video, according to the disclosed embodiments, is shown. As illustrated, in embodiments, process 200 for generating an avatar video may include operations performed in blocks 202-216. The operations may be performed e.g., by facial expression engines 102, avatar animation-rendering engine 104, and/or video generator 106 of FIG. 1.

Process 200 may start at block 202. At block 202, conversations between various characters of a story, for which a video is to be generated, may be received. As described earlier, the conversation may be received via video, voice and/or text inputs (e.g., by corresponding ones of the facial expression engines 102). At block 204, avatars to correspond to the various characters may be chosen (e.g., via a user interface of animation-rendering engine 104).

From block 204, process 200 may proceed to blocks 206, 208, and/or 210, where the video, voice and/or text inputs may correspondingly fed to e.g., respective ones of facial expression engines 102, to process. As described earlier, image frames of the video inputs may be analyzed to identify landmarks of a face and/or head poses in the image frames, and in turn, animation messages 108 with facial expression parameters depicting facial expressions, such as eye and/or mouth movements, or head poses, may be generated based at least in part on the identified landmarks of a face and/or head poses. Audio inputs may be analyzed e.g., for volume and/or syllables, and in turn, animation messages 108 with facial expression parameters depicting facial expressions, such as mouth movements may be generated based at least in part on the identified volume and/or syllables. Text may be analyzed e.g., for semantics, and in turn, animation messages 108 with facial expression parameters depicting facial expressions, such as mouth movements, may be generated based at least in part on the identified semantics.

From blocks 206, 208 and 210, process 200 may proceed to block 212. At block 212, the various avatars may be animated and rendered with facial expressions, in accordance with the animation messages 108 received. Further, the animation and rendering may be captured, e.g., in a number of image frames.

At block 214, a determination may be made whether all conversations between the characters have been animated and captured. If more conversations between the characters are to be animated and captured, process 200 may return to block 204, and continue therefrom, as earlier described. On the other hand, if all conversations between the characters have been animated and captured, process 200 may proceed to block 216. At block 216, the captured image frames may be combined/stitched together to form the video. Thereafter, process 200 may end.

Referring now briefly back to FIG. 1, as described earlier, in embodiments, video driven facial expression engine 112 may be equipped with a tongue-out detector incorporated with teachings of the present disclosure to efficient support detection of a tongue-out condition. In general, tongue is a dynamic facial feature—it shows up only when opening mouth. The shape of the tongue varies across individuals, and its motion is very dynamic. Existing methods for tongue detection mainly fall into two categories—one uses deformable template or active contour model to track the shape of tongue; and the other calculates similarity score of mouth region with template images and then determining the tongue status. Both categories of methods are relatively computational intensive, and not particularly suitable for today's mobile client devices, such as smartphones, computing tablets, and so forth.

Figure 3:
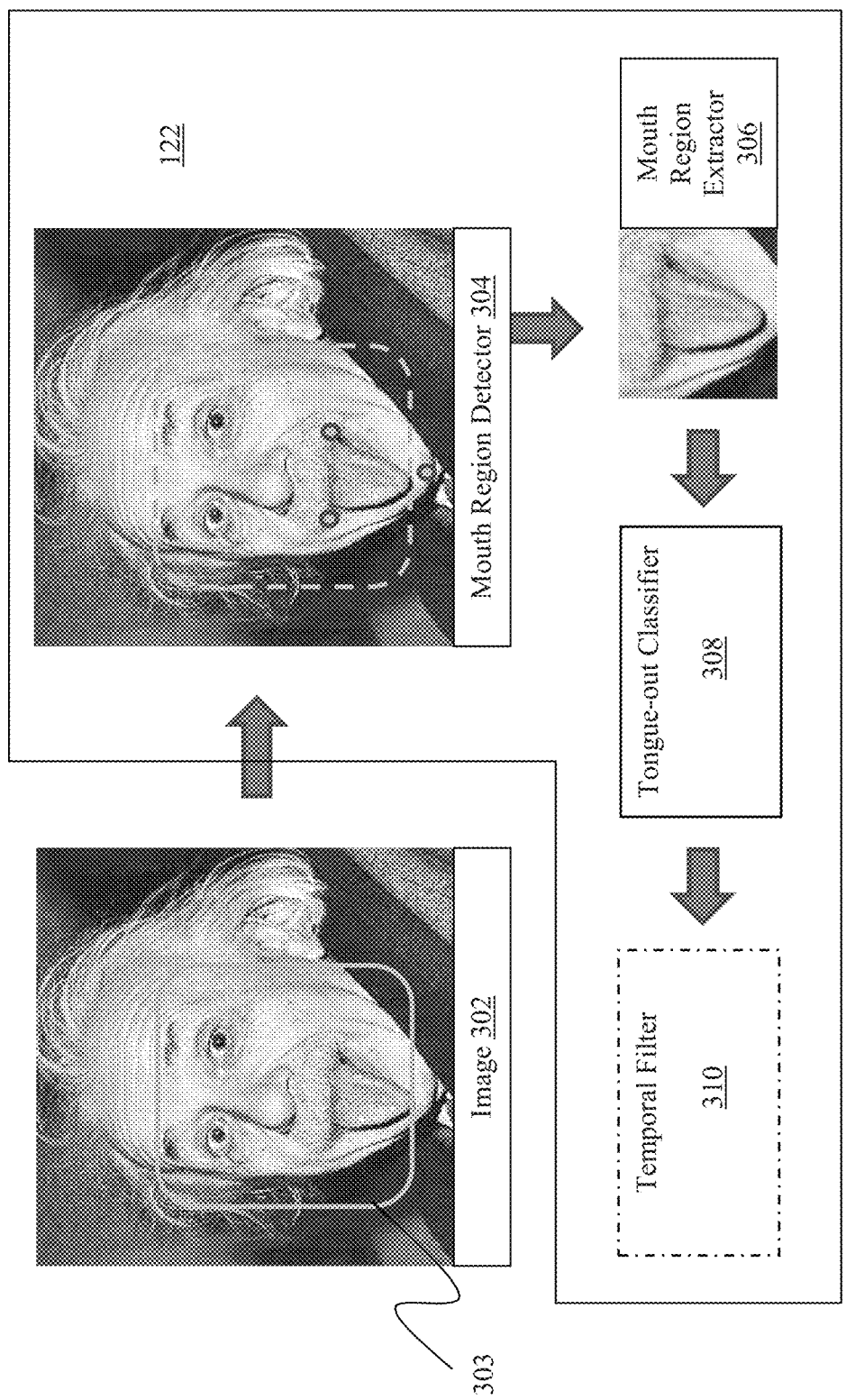
FIG. 3 illustrates a block diagram of the tongue-out-detector of FIG. 1 in further detail, according to the disclosed embodiments.

Referring now to FIG. 3, wherein a block diagram of the tongue-out-detector of FIG. 1, according to the disclosed embodiments, is shown with further details. As illustrated, tongue-out detector 122 may include mouth region detector 304, mouth region extractor 306, tongue-out classifier 308, and optionally, temporal filter 310, coupled with each other. In embodiments, mouth region detector 304 may be configured to receive an image frame with a face identified, e.g., image frame 302 with bounding box 303 identifying a region where a face is located. Further, mouth region detector 304 may be configured to analyze image frame 302, and identify a number of facial landmarks relevant to identifying the mouth region. In embodiments, mouth region detector 304 may be configured to analyze image frame 302, and identify a chin point, a location of the left corner of the mouth, and a location of the right corner of the mouth (depicted by the dots in FIG. 3).

Mouth region extractor 306, on the other hand, may be configured to extract the mouth region from image frame 302, and provide the extracted mouth region to tongue-out classifier 308. In embodiments, mouth region extractor 306 may be configured to extract the mouth region from image frame 302, based at least in part on the relevant landmarks, e.g., the chin point, the location of the left corner of the mouth, and the location of the right corner of the mouth.

Figure 4:
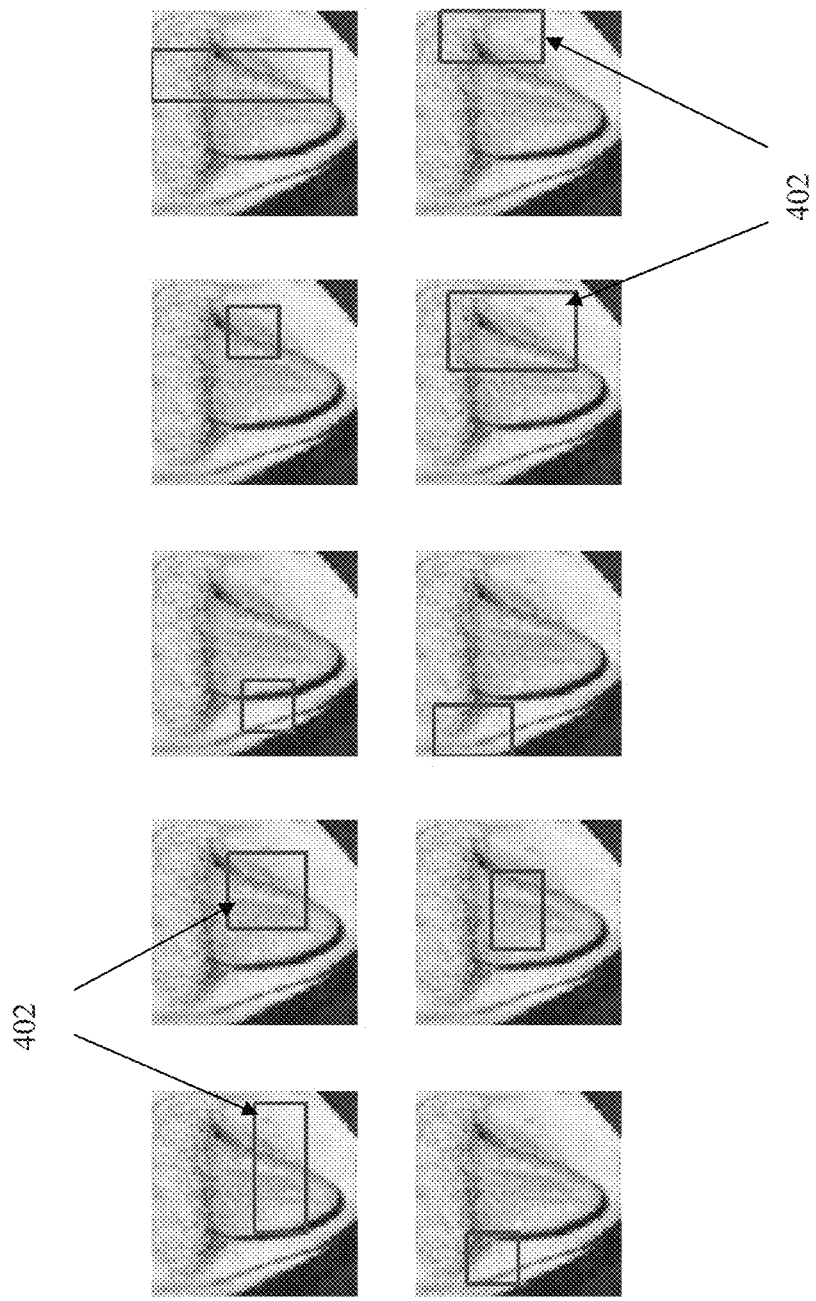
FIG. 4 illustrates sub-windows of an extracted mouth region, according to the disclosed embodiments.

Tongue-out classifier 308 may be configured to receive the extracted mouth region for an image frame. In embodiments, tongue-out classifier 308 may be trained with hundreds or thousands of mouth regions without tongue-out or with tongue-out in a wide variety of manners (i.e., negative and positive samples of tongue-out) for a large number of tongues of different sizes and shapes. In embodiments, tongue-out classifier 308 is trained to recognize attributes of a number of sub-windows of an extracted mouth region with a tongue-out condition. In embodiments, tongue-out classifier 308 may employ any one of a number classifier methods including, but are not limited to, Adaboost, Neural network, Support vector machine, etc. See FIG. 4 where a number of example potential relevant sub-windows using the Adaboost method, are illustrated. In embodiments, tongue-out classifier 308 may be configured to determine whether to classify an extracted mouth region as having a tongue-out condition by calculating and comparing attributes within the reference sub-windows 402 of the extracted mouth region being analyzed.

In embodiments, calculation and comparison may be performed for Haar-like features. A Haar-like feature analysis is an analysis that considers adjacent rectangular regions at a specific location in a detection window, sums up the pixel intensities in each region and calculates the difference between these sums. This difference is then used to categorize subsections of the image frame.

In other embodiments, calculation and comparison may be performed for histogram of oriented gradient (HOG), gradient, or summed gradient features. HOG features are feature descriptors used in computer vision and image processing for the purpose of object detection. The technique counts occurrences of gradient orientation in localized portions of the image frame. Summed Gradient features are feature descriptors that counts the sum of gradient-x and sum of gradient-y in a selected sub-window of the image frame.

Optional temporal filter 310 may be configured to avoid giving false indication of the detection of a tongue-out condition. In embodiments, optional temporal filter 310 may be configured to apply filtering to the output of tongue-out classifier 308. More specifically, optional temporal filter 310 may be configured to apply filtering to the output of tongue-out classifier 308 to provide affirmative notification of the tongue-out condition, only after N successive receipt of tongue-out classifier outputs indicating detection of tongue-out. N may be a configurable integer, empirically determined, depending on the accuracy desired. For example, a relatively higher N may be set, if it is desirable to avoid false positive, or a relatively lower N may be set, if it is desirable to avoid false negative. In embodiments, if false negative is not a concern, temporal filtering may be skipped.

Figure 5:
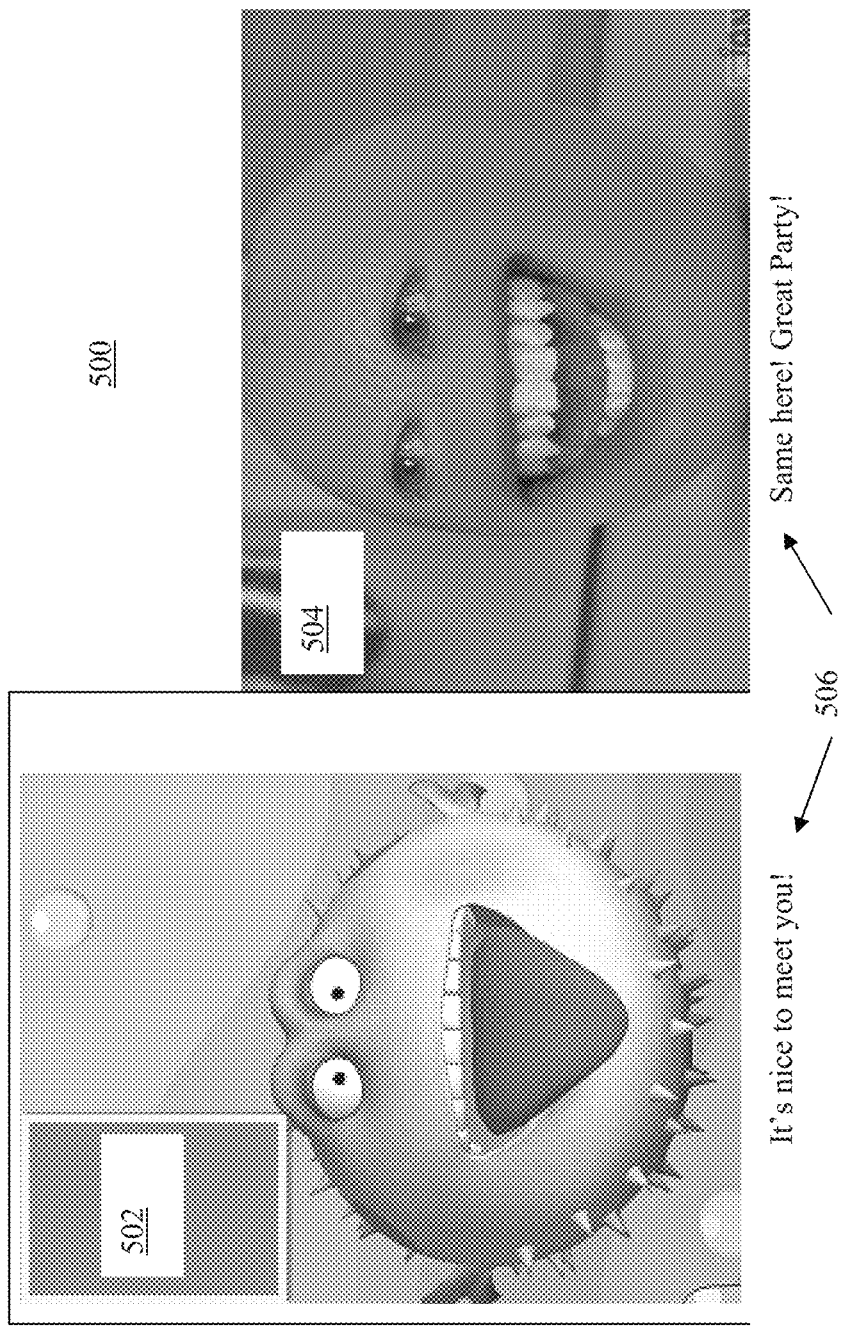
FIG. 5 illustrates two image frames of a generated video, according to the disclosed embodiments.

Referring now to FIG. 5, wherein two example image frames of an example generated video, according to the disclosed embodiments, are shown. As described earlier, video generator 106 may be configured to capture the animation and rendering of animation-rendering engine 104 into a number of image frames. Further, the captured image frames may be combined/stitched together to form a video. Illustrated in FIG. 5 are two example image frames 502 and 504 of an example video 500. Example image frames 502 and 504 respectively capture animation of two avatars corresponding to two characters speaking their dialogues 506. While dialogues 506 are illustrated as captions in example images 502 and 504, in embodiments, dialogues 506 may additionally or alternatively captured as audio (with or without companion captions). As illustrated by example image frame 502, tongue-out detector 122 enables efficient detection and animation of a tongue-out condition for an avatar/character.

While tongue-out detector 122 has been described in the context of VDFEE 112 to facilitate efficient detection of tongue-out conditions for the animation and rendering of avatars in the generation of avatar video, the usage of tongue-out detector 122 is not so limited. It is anticipated tongue-out detector 122 may be used in a wide variety of computer-vision applications. For example, tongue-out detector 122 may be used in interactive applications, to trigger various control commands in video games in response to the detection of various tongue-out conditions.

Additionally, while avatar video generation system 100 is designed to be particularly suitable to be operated on a mobile device, such as a smartphone, a phablet, a computing tablet, a laptop computer, or an e-reader, the disclosure is not to be so limited. It is anticipated that avatar video generation system 100 may also be operated on computing devices with more computing power than the typical mobile devices, such as a desktop computer, a game console, a set-top box, or a computer server.

Figure 6:
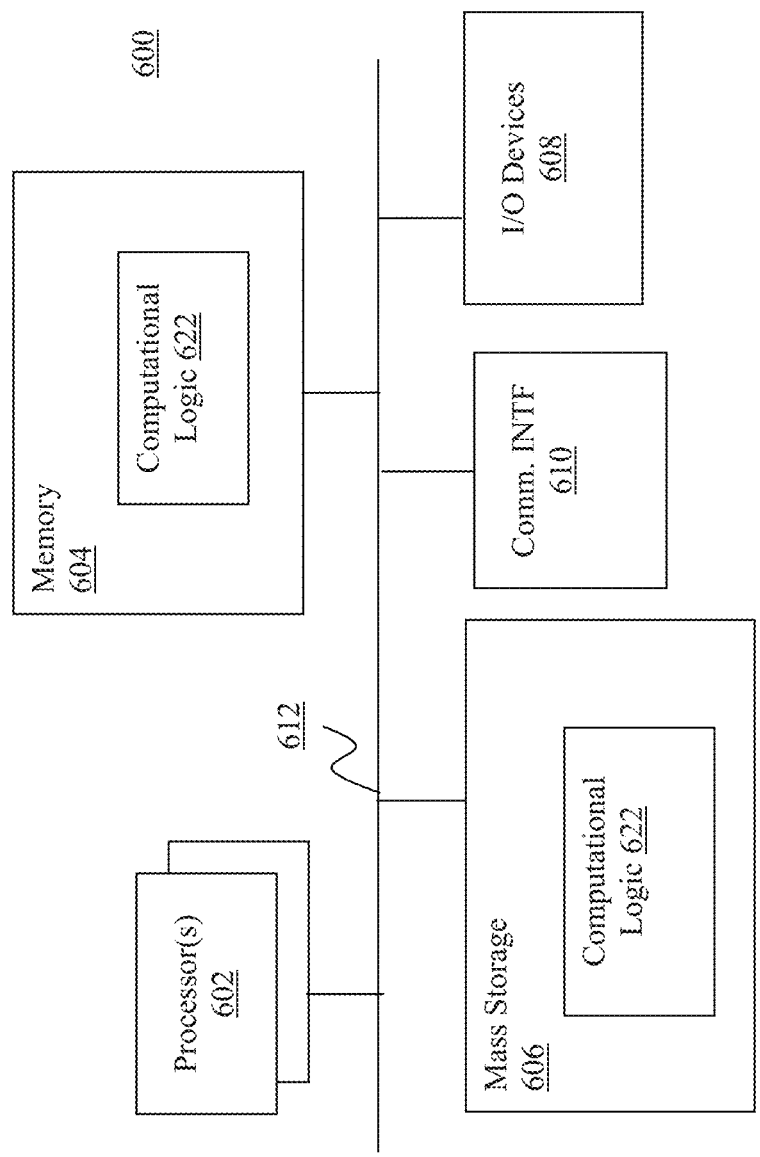
FIG. 6 illustrates an example computer system suitable for use to practice various aspects of the present disclosure, according to the disclosed embodiments.

FIG. 6 illustrates an example computer system that may be suitable for use to practice selected aspects of the present disclosure. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control and so forth) and communication interfaces 610 (such as network interface cards, modems and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with face and facial expression engines 102, avatar animation-rendering engine 104 and video generator 106, earlier described, collectively referred to as computational logic 622. The various elements may be implemented by assembler instructions supported by processor(s) 602 or high-level languages, such as, for example, C, that can be compiled into such instructions.

The number, capability and/or capacity of these elements 610-612 may vary, depending on whether computer 600 is used as a mobile device, a stationary device or a server. When use as mobile device, the capability and/or capacity of these elements 610-612 may vary, depending on whether the mobile device is a smartphone, a computing tablet, an ultrabook or a laptop. Otherwise, the constitutions of elements 610-612 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., computer 600, in response to execution of the programming instructions, to perform, e.g., various operations associated with facial expression engines 102, avatar animation-rendering engine 104 and video generator 106. In alternate embodiments, programming instructions 704 may be disposed on multiple computer-readable non-transitory storage media 702 instead. In alternate embodiments, programming instructions 704 may be disposed on computer-readable transitory storage media 702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 6, for one embodiment, at least one of processors 602 may be packaged together with memory having computational logic 622 (in lieu of storing on memory 604 and storage 606). For one embodiment, at least one of processors 602 may be packaged together with memory having computational logic 622 to form a System in Package (SiP). For one embodiment, at least one of processors 602 may be integrated on the same die with memory having computational logic 622. For one embodiment, at least one of processors 602 may be packaged together with memory having computational logic 622 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for animating-rendering an avatar, comprising: one or more processors; and a tongue-out detector to be operated by the one or more processors to detect a tongue-out condition in an image frame. The tongue-out detector may include a mouth region detector configured to identify locations of a plurality of facial landmarks associated with identifying a mouth in the image frame; a mouth region extractor configured to extract a mouth region from the image frame, based at least in part on the locations of the plurality of facial landmarks identified; and a tongue classifier configured to analyze a plurality of sub-windows within the mouth region extracted to detect for tongue-out.

Example 2 may be example 11, wherein the mouth region detector may identify locations of a chin point, a left corner of the mouth, and a right corner of the mouth in the image frame, and wherein the mouth region extractor is to extract the mouth region from the image frame, based at least in part the locations of the chin point, the left corner of the mouth, and the right corner of the mouth identified.

Example 3 may be example 2, wherein the mouth region extractor may further size-wise normalize the mouth region extracted.

Example 4 may be any one of examples 1-3, wherein the tongue classifier is to analyze the plurality of sub-windows for a plurality of tongue-out features, including Haar-like features, histogram of gradient features, gradient features, or summed gradient features.

Example 5 may be any one of examples 1-4, wherein the tongue-out detector may further comprise a temporal filter to receive a plurality of results of the tongue classifier for a plurality of image frames, and output a notification of tongue-out detection on successive receipt of a plurality of results from the tongue classifier indicating tongue-out detection for a plurality of successive image frames.

Example 6 may be an apparatus for animating and rendering a plurality of avatars. The apparatus may comprise one or more facial expression engines, an animation-rendering engine, and a video generator. The one or more facial expression engines may be configured to receive video, voice or text inputs, and generate a plurality of animation messages having facial expression parameters that depict facial expressions for the plurality of avatars based at least in part on the video, voice or text inputs received. The animation-rendering engine may be coupled with the one or more facial expression engines and configured to receive the one or more animation messages, and drive a plurality of avatar models, in accordance with the plurality of animation messages, to animate and render the plurality of avatars with the facial expressions depicted. The video generator may be coupled with the animation-rendering engine and configured to capture the animation and rendering of the plurality of avatars, and generate a video based at least in part on the animation and rendering captured.

Example 7 may be example 6, wherein the one or more facial expression engines may comprise a video driven facial expression engine to receive video inputs having a plurality of image frames, analyze the image frames, and generate at least a subset of the plurality of animation messages having facial expression parameters that depict facial expressions for the plurality of avatars, based at least in part on results of the analysis of the image frames.

Example 8 may be example 7, wherein the video driven facial expression engine may analyze the image frames for landmarks of a face or head poses, and generate at least a subset of the plurality of animation messages having facial expression parameters that depict facial expressions for the plurality of avatars, including eye and mouth movements or head poses of the avatars, based at least in part on landmarks of a face or head poses in the image frames.

Example 9 may be any one of examples 6-8, wherein the one or more facial expression engines may comprise a voice recognition facial expression engine to receive audio inputs, analyze the audio inputs, and generate at least a subset of the plurality of animation messages having facial expression parameters that depict facial expressions for the plurality of avatars, based at least in part on results of the analysis of the audio input.

Example 10 may be example 9, wherein the voice recognition facial expression engine may analyze the audio inputs for at least volume or syllable, and generate at least a subset of the plurality of animation messages having facial expression parameters that depict facial expressions for the plurality of avatars, including mouth movements of the plurality of avatars, based at least in part on volume or syllable of the audio inputs.

Example 11 may be any one of examples 6-10, wherein the one or more facial expression engines may comprise a text based facial expression engine to receive text inputs, analyze the text inputs, and generate at least a subset of the plurality of animation messages having facial expression parameters depicting facial expressions for the plurality of avatars, based at least in part on results of the analysis of the text inputs.

Example 12 may be example 11, wherein the text based facial expression engine may analyze the text inputs for semantics, and generate at least a subset of the plurality of animation messages having facial expression parameters that depict facial expressions for the plurality of avatars, including mouth movements of the plurality of avatars, based at least in part on semantics of the text inputs.

Example 13 may be example 6, wherein the video generator may capture a plurality of image frames of the animation and rendering of the plurality of avatars, and generate a video based at least in part on the image frames of the animation and rendering captured.

Example 14 may be any one of examples 6-13, wherein the one or more facial expression engines may comprise a video driven facial expression engine that includes a tongue-out detector to detect a tongue-out condition in an image frame.

Example 15 may be example 14, wherein the tongue-out detector may comprise: a mouth region detector configured to identify locations of a plurality of facial landmarks associated with identifying a mouth in the image frame; a mouth region extractor coupled with the mouth region detector and configured to extract a mouth region from the image frame, based at least in part on the locations of the plurality of facial landmarks identified, and a tongue classifier coupled with the mouth region extractor and configured to analyze a plurality of sub-windows within the mouth region extracted to detect for tongue-out.

Example 16 may be example 15, wherein the mouth region detector may identify locations of a chin point, a left corner of the mouth, and a right corner of the mouth in the image frame, and wherein the mouth region extractor is to extract the mouth region from the image frame, based at least in part the locations of the chin point, the left corner of the mouth, and the right corner of the mouth identified.

Example 17 may be example 16, wherein the mouth region extractor may further size-wise normalize the mouth region extracted.

Example 18 may be any one of examples 15-17, wherein the tongue classifier may analyze the plurality of sub-windows for a plurality of tongue-out features, including Haar-like features, histogram of gradient features, gradient features, or summed gradient features.

Example 19 may be any one of examples 15-18, wherein the tongue-out detector further may comprise a temporal filter to receive a plurality of results of the tongue classifier for a plurality of image frames, and output a notification of tongue-out detection on successive receipt of a plurality of results from the tongue classifier that indicate tongue-out detection for a plurality of successive image frames.

Example 20 may be a method for animating-rendering an avatar, comprising receiving, by a computing device, a plurality of image frames; and detecting for a tongue-out condition in one or more of the image frames. Detecting may include: identifying locations of a plurality of facial landmarks associated with identifying a mouth in an image frame; extracting a mouth region from the image frame, based at least in part on the locations of the plurality of facial landmarks identified; and analyzing a plurality of sub-windows within the mouth region extracted to detect for tongue-out.

Example 21 may be example 20, wherein identifying may comprise identifying locations of a chin point, a left corner of the mouth, and a right corner of the mouth in the image frame, and wherein extracting may comprise extracting the mouth region from the image frame, based at least in part the locations of the chin point, the left corner of the mouth, and the right corner of the mouth identified.

Example 22 may be example 21, wherein extracting may further comprise size-wise normalizing the mouth region extracted.

Example 23 may be any one of examples 20-22, wherein analyzing may comprise analyzing the plurality of sub-windows for a plurality of tongue-out features, including Haar-like features, histogram of gradient features, gradient features, or summed gradient features.

Example 24 may be any one of examples 20-23, further comprising temporally filtering a plurality of results of the analyses for a plurality of image frames, and output a notification of tongue-out detection on successive receipt of a plurality of results indicating tongue-out detection for a plurality of successive image frames.

Example 25 may be a method for animating and rendering a plurality of avatars, comprising: receiving, by a computing device, video, voice or text inputs; generating, by the computing device, a plurality of animation messages having facial expression parameters that depict facial expressions for the plurality of avatars based at least in part on the video, voice or text inputs received; driving, by the computing device, a plurality of avatar models, in accordance with the plurality of animation messages, to animate and render the plurality of avatars with the facial expressions depicted; and capturing, by the computing device, the animation and rendering of the plurality of avatars to generate a video based at least in part on the animation and rendering captured.

Example 26 may be example 25, wherein receiving may comprise receiving video inputs having a plurality of image frames; and generating comprises analyzing the image frames for landmarks of a face or head poses, and generating at least a subset of the plurality of animation messages having facial expression parameters that depict facial expressions for the plurality of avatars, including eye and mouth movements or head poses of the avatars, based at least in part on landmarks of a face or head poses in the image frames.

Example 27 may be example 25 or 26, wherein receiving may comprise receiving audio inputs; and generating comprises analyzing the audio inputs for at least volume or syllable, and generating at least a subset of the plurality of animation messages having facial expression parameters that depict facial expressions for the plurality of avatars, including mouth movements of the plurality of avatars, based at least in part on volume or syllable of the audio inputs.

Example 28 may be example 25, 26 or 27, wherein receiving may comprise receiving text inputs; and generating comprises analyzing the text inputs for semantics, and generating at least a subset of the plurality of animation messages having facial expression parameters that depict facial expressions for the plurality of avatars, including mouth movements of the plurality of avatars, based at least in part on semantics of the text inputs.

Example 29 may be any one of examples 25-28, wherein capturing may comprise capturing a plurality of image frames of the animation and rendering of the plurality of avatars, to generate a video based at least in part on the image frames of the animation and rendering captured.

Example 30 may be example 26, wherein analyzing may comprise detecting a tongue-out condition in an image frame.

Example 31 may be example 30, wherein detecting a tongue-out condition may comprise: identifying locations of a plurality of facial landmarks associated with identifying a mouth in the image frame; extracting a mouth region from the image frame, based at least in part on the locations of the plurality of facial landmarks identified, and analyzing a plurality of sub-windows within the mouth region extracted to detect for tongue-out.

Example 32 may be example 31, wherein identifying may comprise identifying locations of a chin point, a left corner of the mouth, and a right corner of the mouth in the image frame, and extracting the mouth region from the image frame, based at least in part the locations of the chin point, the left corner of the mouth, and the right corner of the mouth identified.

Example 33 may be example 32, wherein extracting comprises size-wise normalizing the mouth region extracted.

Example 34 may be any one of examples 31-33, wherein analyzing a plurality of sub-windows comprises analyzing the plurality of sub-windows for a plurality of tongue-out features, including Haar-like features, histogram of gradient features, gradient features, or summed gradient features.

Example 35 may be any one of examples 30-34, further comprising temporally filtering a plurality of results of the tongue detecting for a plurality of image frames, and output a notification of tongue-out detection on successive receipt of a plurality of results that indicate tongue-out detection for a plurality of successive image frames.

Example 36 may be at least one computer-readable medium having instructions to cause a computing device, in response to execution of the instruction by the computing device, to: receive a plurality of image frames; and detect for a tongue-out condition in one or more of the image frames. Detection may include: identification of locations of a plurality of facial landmarks associated with identifying a mouth in an image frame; extraction of a mouth region from the image frame, based at least in part on the locations of the plurality of facial landmarks identified; and analysis of a plurality of sub-windows within the mouth region extracted to detect for tongue-out.

Example 37 may be example 36, wherein identification may comprise identification of locations of a chin point, a left corner of the mouth, and a right corner of the mouth in the image frame, and wherein extracting comprises extracting the mouth region from the image frame, based at least in part the locations of the chin point, the left corner of the mouth, and the right corner of the mouth identified.

Example 38 may be example 37, wherein extraction may further comprise size-wise normalization of the mouth region extracted.

Example 39 may be any one of examples 36-38, wherein to analyze may comprise to analyze the plurality of sub-windows for a plurality of tongue-out features, including Haar-like features, histogram of gradient features, gradient features, or summed gradient features.

Example 40 may be any one of examples 36-39, wherein the computing device may be further caused to temporally filter a plurality of results of the analyses for a plurality of image frames, and output a notification of tongue-out detection on successive receipt of a plurality of results indicating tongue-out detection for a plurality of successive image frames.

Example 41 may be at least one computer-readable medium having instructions to cause a computing device, in response to execution of the instruction by the computing device, to: receive video, voice or text inputs; generate a plurality of animation messages having facial expression parameters that depict facial expressions for the plurality of avatars based at least in part on the video, voice or text inputs received; drive a plurality of avatar models, in accordance with the plurality of animation messages, to animate and render the plurality of avatars with the facial expressions depicted; and capture the animation and rendering of the plurality of avatars to generate a video based at least in part on the animation and rendering captured.

Example 42 may be example 41, wherein to receive may comprise to receive video inputs having a plurality of image frames; and to generate comprises to analyze the image frames for landmarks of a face or head poses, and generate at least a subset of the plurality of animation messages having facial expression parameters that depict facial expressions for the plurality of avatars, including eye and mouth movements or head poses of the avatars, based at least in part on landmarks of a face or head poses in the image frames.

Example 43 may be example 41 or 42, wherein to receive may comprise to receive audio inputs; and to generate comprises to analyze the audio inputs for at least volume or syllable, and to generate at least a subset of the plurality of animation messages having facial expression parameters that depict facial expressions for the plurality of avatars, including mouth movements of the plurality of avatars, based at least in part on volume or syllable of the audio inputs.

Example 44 may be example 41, 42 or 43, wherein to receive may comprise to receive text inputs; and to generate comprises to analyze the text inputs for semantics, and to generate at least a subset of the plurality of animation messages having facial expression parameters that depict facial expressions for the plurality of avatars, including mouth movements of the plurality of avatars, based at least in part on semantics of the text inputs.

Example 45 may be any one of examples 41-44, wherein to capture may comprise to capture a plurality of image frames of the animation and rendering of the plurality of avatars, to generate a video based at least in part on the image frames of the animation and rendering captured.

Example 46 may be any one of examples 42-45, wherein to analyze may comprise to detect a tongue-out condition in an image frame.

Example 47 may be example 46, wherein to detect a tongue-out condition may comprise: identification of locations of a plurality of facial landmarks associated with identifying a mouth in the image frame; extraction of a mouth region from the image frame, based at least in part on the locations of the plurality of facial landmarks identified, and analysis of a plurality of sub-windows within the mouth region extracted to detect for tongue-out.

Example 48 may be example 47, wherein identification may comprise identification of locations of a chin point, a left corner of the mouth, and a right corner of the mouth in the image frame, and extracting the mouth region from the image frame, based at least in part the locations of the chin point, the left corner of the mouth, and the right corner of the mouth identified.

Example 49 may be example 48, wherein extraction may comprise size-wise normalization of the mouth region extracted.

Example 50 may be any one of examples 47-49, wherein to analyze a plurality of sub-windows may comprise to analyze the plurality of sub-windows for a plurality of tongue-out features, including Haar-like features, histogram of gradient features, gradient features, or summed gradient features.

Example 51 may be any one of examples 46-50, wherein to analyze may further comprise to temporally filter a plurality of results of the tongue detection for a plurality of image frames, and output a notification of tongue-out detection on successive receipt of a plurality of results that indicate tongue-out detection for a plurality of successive image frames.

Example 51 may be an apparatus for animating-rendering an avatar, comprising: one or more processors; and tongue-out detection means for detecting a tongue-out condition in an image frame. The tongue-out detections means may include: mouth region detection means for identifying locations of a plurality of facial landmarks associated with identifying a mouth in the image frame; mouth region extraction means for extracting a mouth region from the image frame, based at least in part on the locations of the plurality of facial landmarks identified; and tongue classification means for analyzing a plurality of sub-windows within the mouth region extracted to detect for tongue-out.

Example 53 may be example 52, wherein the mouth region detection means may comprise means for identifying locations of a chin point, a left corner of the mouth, and a right corner of the mouth in the image frame, and wherein the mouth region extraction means comprises means for extracting the mouth region from the image frame, based at least in part the locations of the chin point, the left corner of the mouth, and the right corner of the mouth identified.

Example 54 may be example 53, wherein the mouth region extraction means may comprise means for size-wise normalizing the mouth region extracted.

Example 55 may be any one of examples 52-54, wherein the tongue classification means may comprise means for analyzing the plurality of sub-windows for a plurality of tongue-out features, including Haar-like features, histogram of gradient features, gradient features, or summed gradient features.

Example 56 may be any one of examples 52-55, wherein the tongue-out detection means may comprise means for temporally filtering a plurality of results of the tongue classification means for a plurality of image frames, and outputting a notification of tongue-out detection on successive receipt of a plurality of results from the tongue classification means indicating tongue-out detection for a plurality of successive image frames.

Example 57 may be an apparatus for animating and rendering a plurality of avatars, comprising: facial expression means for receiving video, voice or text inputs, and generating a plurality of animation messages having facial expression parameters that depict facial expressions for the plurality of avatars based at least in part on the video, voice or text inputs received; animation-rendering means for receiving the one or more animation messages, and driving a plurality of avatar models, in accordance with the plurality of animation messages, to animate and render the plurality of avatars with the facial expressions depicted; and video generation means for capturing the animation and rendering of the plurality of avatars, and generate a video based at least in part on the animation and rendering captured.

Example 58 may be example 57, wherein the facial expression means may comprise video driven facial expression means for receiving video inputs having a plurality of image frames, analyze the image frames for landmarks of a face or head poses, and generating at least a subset of the plurality of animation messages having facial expression parameters that depict facial expressions for the plurality of avatars, including eye and mouth movements or head poses of the avatars, based at least in part on landmarks of a face or head poses in the image frames.

Example 59 may be example 57 or 58, wherein the facial expression means may comprise voice recognition facial expression means for receiving audio inputs, analyzing the audio inputs for at least volume or syllable, and generating at least a subset of the plurality of animation messages having facial expression parameters that depict facial expressions for the plurality of avatars, including mouth movements of the plurality of avatars, based at least in part on volume or syllable of the audio inputs.

Example 60 may be example 57, 58 or 59, wherein the facial expression means may comprise text based facial expression means for receiving text inputs, analyzing the text inputs for semantics, and generating at least a subset of the plurality of animation messages having facial expression parameters that depict facial expressions for the plurality of avatars, including mouth movements of the plurality of avatars, based at least in part on semantics of the text inputs.

Example 61 may be any one of examples 57-60, wherein the video generation means may comprise means for capturing a plurality of image frames of the animation and rendering of the plurality of avatars, to generate a video based at least in part on the image frames of the animation and rendering captured.

Example 62 may be any one of examples 57-61, wherein the facial expression means may comprise video driven facial expression means that includes tongue-out detection means for detecting a tongue-out condition in an image frame.

Example 63 may be example 62, wherein the tongue-out detection means may comprise: mouth region detection means for identifying locations of a plurality of facial landmarks associated with identifying a mouth in the image frame; mouth region extraction means for extracting a mouth region from the image frame, based at least in part on the locations of the plurality of facial landmarks identified, and tongue classification means for analyzing a plurality of sub-windows within the mouth region extracted to detect for tongue-out.

Example 64 may be example 63, wherein the mouth region detection means may comprise means for identifying locations of a chin point, a left corner of the mouth, and a right corner of the mouth in the image frame, and wherein the mouth region extractor is to extract the mouth region from the image frame, based at least in part the locations of the chin point, the left corner of the mouth, and the right corner of the mouth identified.

Example 65 may be example 64, wherein the mouth region extraction means may comprise means for size-wise normalizing the mouth region extracted.

Example 66 may be any one of examples 63-65, wherein the tongue classification means comprise means for analyzing the plurality of sub-windows for a plurality of tongue-out features, including Haar-like features, histogram of gradient features, gradient features, or summed gradient features.

Example 67 may be any one of examples 63-66, wherein the tongue-out detection means may further comprise temporal filter means for receiving a plurality of results of the tongue classification means for a plurality of image frames, and output a notification of tongue-out detection on successive receipt of a plurality of results from the tongue classification means that indicate tongue-out detection for a plurality of successive image frames.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for animating and rendering a plurality of avatars, comprising:
one or more processors;
one or more facial expression engines operated by the one or more processors to receive video, voice or text inputs, and generate a plurality of animation messages having facial expression parameters that depict facial expressions for the plurality of avatars based at least in part on the video, voice or text inputs received;
an animation-rendering engine coupled with the one or more facial expression engines and operated by the one or more processors to receive the plurality of animation messages, and drive a plurality of avatar models, in accordance with the plurality of animation messages, to animate and render the plurality of avatars with the facial expressions depicted; and
a video generator coupled with the animation-rendering engine and operated by the one or more processors to capture the animation and rendering of the plurality of avatars, and generate a video based at least in part on the animation and rendering captured.

2. The apparatus of claim 1, wherein the one or more facial expression engines comprise a video driven facial expression engine to receive video inputs having a plurality of image frames, analyze the image frames, and generate at least a subset of the plurality of animation messages having facial expression parameters that depict facial expressions for the plurality of avatars, based at least in part on results of the analysis of the image frames.

3. The apparatus of claim 2, wherein the video driven facial expression engine is to analyze the image frames for landmarks of a plurality of face or head poses, and generate at least a subset of the plurality of animation messages having facial expression parameters that depict facial expressions for the plurality of avatars, including eye and mouth movements or head poses of the avatars, based at least in part on the landmarks of the face or head poses in the image frames.

4. The apparatus of claim 1, wherein the one or more facial expression engines comprise a voice recognition facial expression engine to receive audio inputs, analyze the audio inputs, and generate at least a subset of the plurality of animation messages having facial expression parameters that depict facial expressions for the plurality of avatars, based at least in part on results of the analysis of the audio input.

5. The apparatus of claim 4, wherein the voice recognition facial expression engine is to analyze the audio inputs for at least volume or syllable, and generate at least a subset of the plurality of animation messages having facial expression parameters that depict facial expressions for the plurality of avatars, including mouth movements of the plurality of avatars, based at least in part on volume or syllable of the audio inputs.

6. The apparatus of claim 1, wherein the one or more facial expression engines comprise a text based facial expression engine to receive text inputs, analyze the text inputs, and generate at least a subset of the plurality of animation messages having facial expression parameters depicting facial expressions for the plurality of avatars, based at least in part on results of the analysis of the text inputs.

7. The apparatus of claim 6, wherein the text based facial expression engine is to analyze the text inputs for semantics, and generate at least a subset of the plurality of animation messages having facial expression parameters that depict facial expressions for the plurality of avatars, including mouth movements of the plurality of avatars, based at least in part on semantics of the text inputs.

8. The apparatus of claim 6, wherein the video generator is to capture a plurality of image frames of the animation and rendering of the plurality of avatars, and generate a video based at least in part on the image frames of the animation and rendering captured.

9. The apparatus of claim 6, wherein the one or more facial expression engines comprise a video driven facial expression engine that includes a tongue-out detector to detect a tongue-out condition in an image frame.

10. A method for animating and rendering a plurality of avatars, comprising:
  receiving, by a computing device, video, voice or text inputs;
  generating, by the computing device, a plurality of animation messages having facial expression parameters that depict facial expressions for the plurality of avatars based at least in part on the video, voice or text inputs received;
  driving, by the computing device, a plurality of avatar models, in accordance with the plurality of animation messages, to animate and render the plurality of avatars with the facial expressions depicted; and
  capturing, by the computing device, the animation and rendering of the plurality of avatars to generate a video based at least in part on the animation and rendering captured.

11. The method of claim 10, wherein receiving comprises:
  receiving video inputs having a plurality of image frames; and generating comprises analyzing the image frames for landmarks of a plurality of face or head poses, and generating at least a subset of the plurality of animation messages having facial expression parameters that depict facial expressions for the plurality of avatars, including eye and mouth movements or head poses of the avatars, based at least in part on the landmarks of the face or head poses in the image frames;
  receiving audio inputs; and generating comprises analyzing the audio inputs for at least volume or syllable, and generating at least a subset of the plurality of animation messages having facial expression parameters that depict facial expressions for the plurality of avatars, including mouth movements of the plurality of avatars, based at least in part on the volume or syllable of the audio inputs; or
  receiving comprises receiving text inputs; and generating comprises analyzing the text inputs for semantics, and generating at least a subset of the plurality of animation messages having facial expression parameters that depict facial expressions for the plurality of avatars, including the mouth movements of the plurality of avatars, based at least in part on the semantics of the text inputs.

12. The method of claim 11, wherein analyzing the image frames comprises detecting a tongue-out condition in an image frame.

13. At least one non-transitory computer-readable medium having instructions to cause a computing device, in response to execution of the instruction by the computing device, to:
  receive video, voice or text inputs;
  generate a plurality of animation messages having facial expression parameters that depict facial expressions for a plurality of avatars based at least in part on the video, voice or text inputs received;
  drive a plurality of avatar models, in accordance with the plurality of animation messages, to animate and render the plurality of avatars with the facial expressions depicted; and
  capture the animation and rendering of the plurality of avatars to generate a video based at least in part on the animation and rendering captured.

14. The computer-readable medium of claim 13, wherein to receive comprises:
  to receive video inputs having a plurality of image frames; and to generate comprises to analyze the image frames for landmarks of a plurality of face or head poses, and generate at least a subset of the plurality of animation messages having facial expression parameters that depict facial expressions for the plurality of avatars, including eye and mouth movements or head poses of the avatars, based at least in part on the landmarks of the face or head poses in the image frames;
  to receive audio inputs; and to generate comprises to analyze the audio inputs for at least volume or syllable, and to generate at least a subset of the plurality of animation messages having facial expression parameters that depict facial expressions for the plurality of avatars, including the mouth movements of the plurality of avatars, based at least in part on the volume or syllable of the audio inputs; or
  to receive text inputs; and to generate comprises to analyze the text inputs for semantics, and to generate at least a subset of the plurality of animation messages having facial expression parameters that depict facial expressions for the plurality of avatars, including the mouth movements of the plurality of avatars, based at least in part on the semantics of the text inputs.

15. The computer-readable medium of claim 14, wherein to analyze video image frames comprises to detect a tongue-out condition in an image frame.

16. The apparatus of claim 9, wherein the tongue-out detector comprises:
  a mouth region detector to identify locations of a plurality of facial landmarks associated with identifying a mouth in the image frame,
  a mouth region extractor to extract a mouth region from the image frame, based at least in part on the locations of the plurality of facial landmarks identified, and
  a tongue classifier to analyze a plurality of sub-windows within the mouth region extracted to detect for tongue-out.

17. The apparatus of claim 16, wherein the mouth region detector is to identify locations of a chin point, a left corner of the mouth, and a right corner of the mouth in the image frame, and wherein the mouth region extractor is to extract the mouth region from the image frame, based at least in part on the locations of the chin point, the left corner of the mouth, and the right corner of the mouth identified.

18. The apparatus of claim 17, wherein the mouth region extractor is to further size-wise normalize the mouth region extracted.

19. The apparatus of claim 16, wherein the tongue classifier is to analyze the plurality of sub-windows for a plurality of tongue-out features, including Haar-like features, histogram of gradient features, gradient features, or summed gradient features.

20. The apparatus of claim 16, wherein the tongue-out detector further comprises a temporal filter to receive a plurality of results of the tongue classifier for a plurality of image frames, and output a notification of tongue-out detection on successive receipt of a plurality of results from the tongue classifier indicating tongue-out detection for a plurality of successive image frames.

21. The method of claim 12, wherein detecting for a tongue-out condition includes:
  identifying locations of a plurality of facial landmarks associated with identifying a mouth in an image frame, extracting a mouth region from the image frame, based at least in part on the locations of the plurality of facial landmarks identified, and analyzing a plurality of sub-windows within the mouth region extracted to detect for tongue-out.

22. The method of claim 21, wherein identifying comprises identifying locations of a chin point, a left corner of the mouth, and a right corner of the mouth in the image frame, and wherein extracting comprises extracting the mouth region from the image frame, based at least in part on the locations of the chin point, the left corner of the mouth, and the right corner of the mouth identified; and size-wise normalizing the mouth region extracted.

23. The method of claim 21, further comprising temporally filtering a plurality of results of the analyses for a plurality of image frames, and output a notification of tongue-out detection on successive receipt of a plurality of results indicating tongue-out detection for a plurality of successive image frames.

24. The at least one non-transitory computer-readable medium of claim 13, wherein the computing device is further caused to:

detect for a tongue-out condition in one or more image frames of the video, including:

identification of locations of a plurality of facial landmarks associated with identifying a mouth in an image frame, extraction of a mouth region from the image frame, based at least in part on the locations of the plurality of facial landmarks identified, and analysis of a plurality of sub-windows within the mouth region extracted to detect for tongue-out.

25. The computer-readable medium of claim 24, wherein the computing device is further caused to temporally filter a plurality of results of the analyses for a plurality of image frames, and output a notification of tongue-out detection on successive receipt of a plurality of results indicating tongue-out detection for a plurality of successive image frames.

* * * * *